United States Patent
Karami et al.

(10) Patent No.: US 9,027,986 B2
(45) Date of Patent: May 12, 2015

(54) WIPER DEVICE, OPEN/CLOSE GUARD WITH WIPER DEVICE, AND CAB FOR CONSTRUCTION MACHINE

(71) Applicant: Komatsu Ltd., Tokyo (JP)

(72) Inventors: Atsushi Karami, Hirakata (JP); Toshimasa Kanda, Hirakata (JP); Kentarou Watanabe, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/238,056

(22) PCT Filed: Sep. 20, 2012

(86) PCT No.: PCT/JP2012/073974
§ 371 (c)(1),
(2) Date: Feb. 10, 2014

(87) PCT Pub. No.: WO2014/016976
PCT Pub. Date: Jan. 30, 2014

(65) Prior Publication Data
US 2014/0175834 A1    Jun. 26, 2014

(30) Foreign Application Priority Data

Jul. 23, 2012  (JP) .................................. 2012-162501

(51) Int. Cl.
*B60J 7/00*  (2006.01)
*E02F 9/16*  (2006.01)
*B60S 1/56*  (2006.01)
*B60S 1/04*  (2006.01)

(52) U.S. Cl.
CPC ................. *E02F 9/163* (2013.01); *B60S 1/566* (2013.01); *B60S 1/0452* (2013.01)

(58) Field of Classification Search
CPC ........ B60R 21/11; E02F 9/163; B60S 1/0452; B60S 1/566
USPC ......................................... 296/190.03, 190.01
See application file for complete search history.

(56) References Cited

U.S. PATENT DOCUMENTS

| 5,647,086 | A | 7/1997 | Gold |
| 6,261,024 | B1 | 7/2001 | Farber |
| 7,131,686 | B1 * | 11/2006 | Jo et al. .................... 296/190.03 |

FOREIGN PATENT DOCUMENTS

| JP | 5-58759 U | 1/1980 |
| JP | S60-89063 U | 6/1985 |
| JP | 7-101689 A | 4/1995 |
| JP | H1170856 A | 3/1999 |
| JP | 2003-170812 A | 6/2003 |
| JP | 2003-267195 A | 9/2003 |
| JP | 2008-163595 A | 7/2008 |
| JP | 2010-100122 A | 5/2010 |
| JP | 2013-159908 A | 8/2013 |

* cited by examiner

*Primary Examiner* — Glenn Dayoan
*Assistant Examiner* — Melissa A Black
(74) *Attorney, Agent, or Firm* — Drinker Biddle & Reath LLP (57) ABSTRACT

An open/close guard with a wiper device is attachable to a cab with a skylight. The wiper device includes a wiper for wiping a surface of the skylight, and a wiper drive unit that rotatably supports the wiper. The open/close guard includes a fixing frame attachable to the cab, and an open/close guard portion supported by the fixing frame. The open/close guard portion is supported by the fixing frame so that it can be opened or closed from or over the fixing frame.

7 Claims, 10 Drawing Sheets

FIG.10 ic machines. With the second

WIPER DEVICE, OPEN/CLOSE GUARD WITH WIPER DEVICE, AND CAB FOR CONSTRUCTION MACHINE

TECHNICAL FIELD

The present invention relates to a wiper device, an open/close guard with a wiper device, and a cab, and more particularly, to a wiper device attachable to a cab with a skylight, an open/close guard with a wiper device, and a cab for a construction machine including the open/close guard.

BACKGROUND ART

Construction machines in which a wiper device is provided on the front windshield of a cab are known. Japanese Patent Laying-Open No. 2003-267195 (PTD 1), for example, suggests a hydraulic excavator in which a wiper device is provided on the front windshield of a cab. In the hydraulic excavator, a bucket provided at an end of a work implement is lifted above the cab during execution of work. In order to ensure visibility for work in this state, the cab may be provided with a skylight.

In this case, an open/close guard may be provided for protecting the skylight from stones and the like falling from the bucket. This open/close guard has a fixing frame, and an open/close guard portion supported by the fixing frame so that it can be opened or closed from or over the fixing frame. The fixing frame is configured to be attachable to the cab. The open/close guard portion has a mesh portion to prevent passage of stones and the like falling from the bucket, and ensure visibility for work above the cab. The mesh portion is formed to cover the skylight while the fixing frame is attached to the cab and the open/close guard portion is closed over the fixing frame.

Even with the above-described open/close guard being provided on the skylight, rainwater and dust or the like falling from the bucket pass through the meshes of the above-described mesh portion, and adhere to the skylight. It is thus desirable to provide a wiper device on the skylight of a cab as well.

As a wiper device for a vehicle device rather than a construction machine, a wiper device for a vehicle roof is mentioned in Japanese Patent Laying-Open No. 11-70856 (PTD2).

CITATION LIST

Patent Document

PTD 1: Japanese Patent Laying-Open No. 2003-267195
PTD 2: Japanese Patent Laying-Open No. 11-70856

SUMMARY OF INVENTION

Technical Problem

As a structure in which a wiper device is provided on skylight of a cab, the following two structures may be adopted. For example, as a first structure, a structure may be adopted in which a wiper motor is provided inside the cab, and an output shaft of the wiper motor passes through the cab to be connected to a wiper outside the cab. In short, this structure is similar to that of a wiper device for a windshield of a general vehicle. A wiper device for a skylight, on the other hand, cannot be initially attached to the cab, and is often attached later. With the first structure, therefore, it is necessary to provide the cab with a through-hole for allowing the output shaft of the wiper motor to pass therethrough, as additional processing.

As a second structure, a structure is available in which an open/close guard that can be opened or closed is provided with a wiper motor and a wiper. This structure is currently in use for distributed construction machines. With the second structure, it is necessary to adjust the positions of the wiper motor and the wiper while the open/close guard is open and away from the skylight, which makes the adjustment of the positions difficult.

The present invention was made in view of the foregoing object, and an object of the invention is to provide a wiper device that does not require adding other processing or another member to a cab in order to provide a wiper on a skylight, and that allows the position of the wiper to be easily adjusted, an open/close guard including the wiper device, and a cab of a construction machine including the open/close guard.

Solution to Problem

An open/close guard with a wiper device according to the present invention is attachable to a cab with a skylight, and includes a wiper device and an open/close guard. The wiper device includes a wiper for wiping a surface of the skylight, and a wiper drive unit that rotatably supports the wiper. The open/close guard includes a fixing frame attachable to the cab, and an open/close guard portion supported by the fixing frame. The open/close guard portion is supported by the fixing frame so that it can be opened or closed from or over the fixing frame. The wiper drive unit is attached onto the fixing frame.

In the open/close guard with a wiper device according to the present invention, the wiper drive unit that rotatably supports the wiper is attached onto the fixing frame. The fixing frame is attached to the cab for supporting the open/close guard portion. It is therefore unnecessary to add other processing or another member to the cab in order to provide the wiper on the skylight. Furthermore, since a wiper motor is attached to the fixing frame that is attached to the cab, the positions of the wiper drive unit and the wiper can be adjusted while they are not away from the skylight. The position of the wiper can thus be easily adjusted.

In the above-described open/close guard with a wiper device, the fixing frame includes an open/close guard supporting portion that connects the open/close guard portion to the fixing frame so that the open/close guard portion can be opened or closed from or over the fixing frame, an open/close guard fixing portion that can fix the open/close guard portion to the fixing frame while the open/close guard portion is closed over the fixing frame, and a connecting portion that has an attachment portion for the open/close guard supporting portion and an attachment portion for the open/close guard fixing portion, and extends from the attachment portion for the open/close guard supporting portion to the attachment portion for the open/close guard fixing portion. Therefore, the open/close guard supporting portion, the open/close guard supporting portion, and the connecting portion can thus be integrally assembled. This allows the fixing frame to be easily positioned.

In the above-described open/close guard with a wiper device, the open/close guard portion includes a first surrounding portion that surrounds a periphery of the wiper drive unit while the open/close guard portion is closed over the fixing frame. The fixing frame includes a second surrounding portion that surrounds the periphery of the wiper drive unit. The first surrounding portion is disposed outside the second surrounding portion while the open/close guard portion is closed. The first surrounding portion and the second surrounding portion can prevent rainwater from adhering to the wiper drive unit. Furthermore, since the first surrounding portion is disposed outside the second surrounding portion while the open/close guard portion is closed over the fixing frame, it is possible to prevent rainwater attached to a surface of the first surrounding portion from passing through a surface of the second surrounding portion to be attached to the wiper drive unit. Watertightness of the open/close guard with a wiper device can thus be enhanced.

In the above-described open/close guard with a wiper device, the wiper drive unit includes an output shaft. The output shaft is inclined so that an upper portion of the output shaft is positioned to be closer to the skylight than a lower portion of the output shaft. Since the wiper is thus connected to the output shaft while the output shaft of the wiper motor is inclined with respect to the skylight, the wiper can be obliquely pressed against the skylight. Force of the wiper pressing the skylight can thus be increased.

In the above-described open/close guard with a wiper device, the open/close guard portion includes an opening disposed above the wiper drive unit while the open/close guard portion is closed over the fixing frame. This allows the wiper drive unit to be visually recognized through the opening while the open/close guard portion is closed over the fixing frame. The position of the wiper drive unit can thus be accurately recognized.

A cab according to the present invention includes the above-described open/close guard with a wiper device being attached thereto. It is therefore unnecessary to add other processing or another member to the cab in order to provide the wiper on the skylight. Moreover, the position of the wiper can be easily adjusted.

A wiper device for a skylight of a cab of a construction machine according to the present invention includes a wiper and a wiper drive unit. The wiper wipes a surface of the skylight. The wiper drive unit rotatably supports the wiper. The wiper drive unit includes an output shaft and a wiper motor that constitute a subassembly. The output shaft is connected to the wiper. The wiper motor causes the rotation shaft to rotate. The subassembly is attachable onto the cab. The subassembly is attachable onto the fixing frame of the open/close guard for protecting the skylight provided on the cab. Here, the open/close guard includes a fixing frame securely attached to the cab, and an open/close guard portion supported by the fixing frame so that it can be opened or closed from or over the fixing frame.

Since the above-described wiper device allows the subassembly including the driving source of the wiper to be attached onto the cab, it is unnecessary to add other processing or another member to the cab when retrofitting the wiper device, leading to easy positional adjustment relative to the skylight.

Advantageous Effects of Invention

As described above, according to the present invention, it is unnecessary to add other processing or another member to a cab in order to provide a wiper on a skylight, and the position of the wiper can be easily adjusted.

DESCRIPTION OF EMBODIMENTS

Embodiments of the present invention will be described hereinafter based on the drawings.

First, a structure of a construction machine according to an embodiment of the present invention will be described. Although a hydraulic excavator will be described as one example of a construction machine to which the concept of the present invention can be applied, the present invention is applicable to any construction machine including a cab with a skylight.

Figure 1:
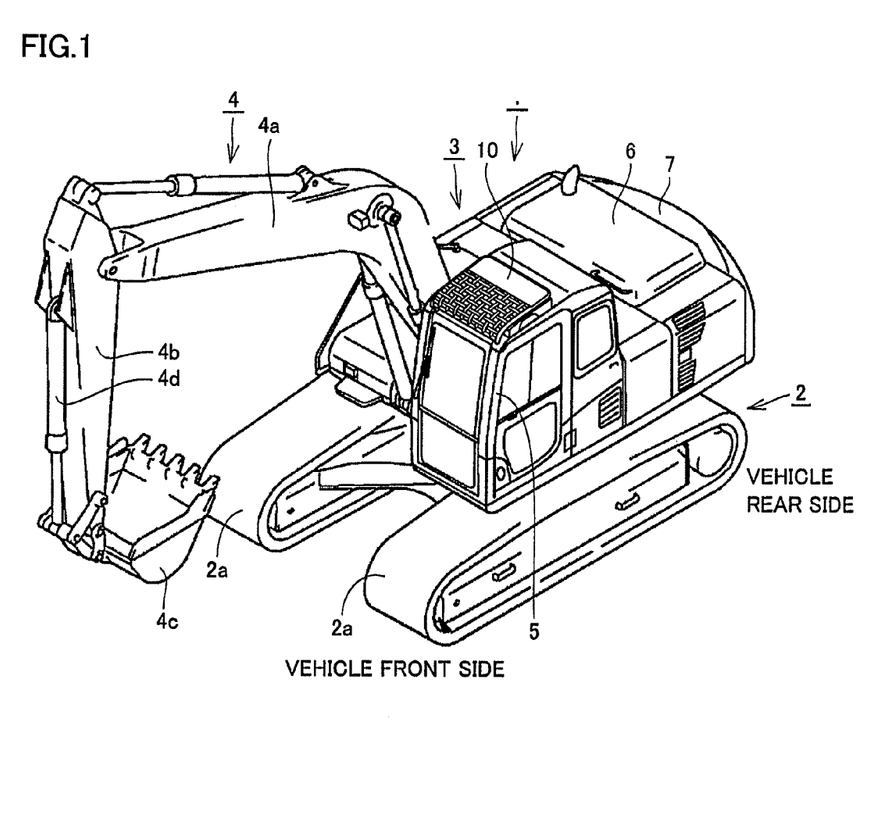
FIG. 1 is a perspective view schematically illustrating the structure of a hydraulic excavator according to one embodiment of the present invention.

Referring to FIG. 1, a hydraulic excavator 1 mainly includes a lower traveling unit 2, an upper revolving unit 3, a work implement 4, and an open/close guard with a wiper device 10. Lower traveling unit 2 is configured to run autonomously by the rotational driving of a pair of left and right crawler belts 2a. Upper revolving unit 3 is mounted to be rotatable about lower traveling unit 2. Work implement 4 is pivotably arranged on a front side of upper revolving unit 3 to move up and down. Work implement 4 includes a boom 4a, an arm 4b, a bucket 4c, and hydraulic cylinders 4d.

The aforementioned lower traveling unit 2 and upper revolving unit 3 mainly constitute a construction vehicle main body. Upper revolving unit 3 includes a cab 5 on a front left side (vehicle front side), as well as an engine compartment 6 for housing an engine and a counterweight 7 on a rear side (vehicle rear side). In the present embodiment, the front/rear and left/right of the vehicle are based on the operator seated in cab 5. Open/close guard with a wiper device 10 is attached to cab 5.

Figure 2:
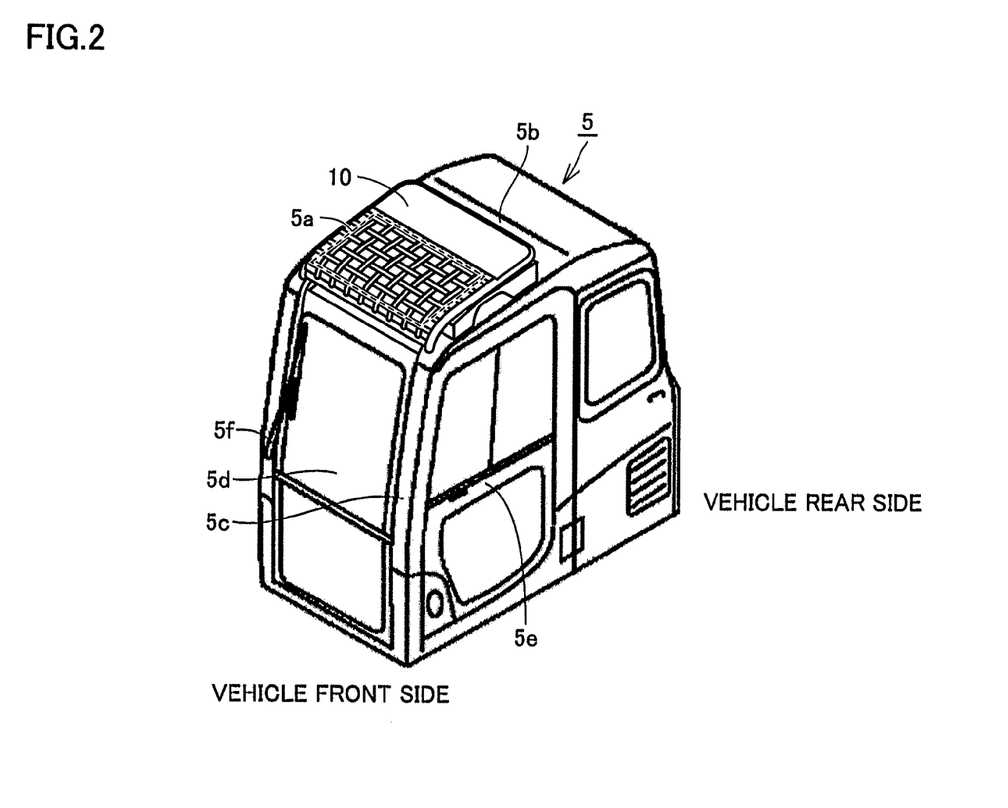
FIG. 2 is an enlarged view of a cab of the hydraulic excavator of FIG. 1.

Referring to FIG. 2, cab 5 mainly includes a skylight 5a, a top panel 5b, pillars 5c, a front windshield 5d, a door 5e, and a front windshield wiper 5f. Top panel 5b with skylight 5a is disposed on a roof portion of cab 5. Skylight 5a is disposed on the front side of cab 5.

Pillar 5c extends vertically between the roof portion and a floor portion of cab 5, supporting the roof portion relative to the floor portion. Front windshield 5d is disposed on the front side of cab 5 between pillars 5c. On the left side of cab 5, door 5e is disposed between pillars 5c. Front windshield wiper 5f is supported by pillar 5c such that it can clean the surface of front windshield 5d.

Open/close guard with a wiper device 10 is attached to top panel 5b to cover skylight 5a. Open/close guard with a wiper device 10 is disposed on the front side of cab 5. Open/close guard with a wiper device 10 is formed from the roof portion of cab 5 to a portion along an upper end of the front portion.

Next, referring to FIGS. 3 to 6, the structure of the open/close guard with a wiper device according to the present embodiment will be described in detail. Open/close guard with a wiper device 10 is configured to be attachable to cab 5. Mainly referring to FIGS. 3 and 4, open/close guard with a wiper device 10 mainly has a fixing frame 11, an open/close guard portion 12, and a wiper device 15. Wiper device 15 mainly has a wiper 13 and a wiper drive unit 14. Wiper drive unit 14 mainly has a wiper motor 14c and an output shaft 14d.

Figure 3:
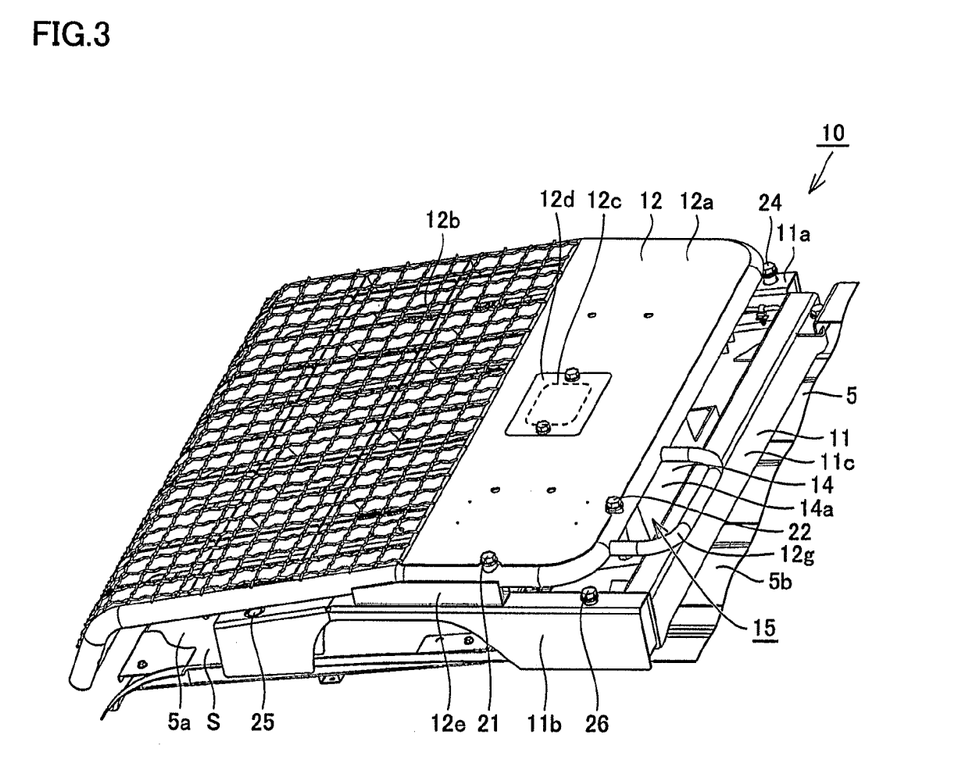
FIG. 3 is a perspective view schematically illustrating a state in which an open/close guard with a wiper according to one embodiment of the present invention is attached to the cab, and illustrating a state in which an open/close guard portion is closed over a fixing frame.
Figure 4:
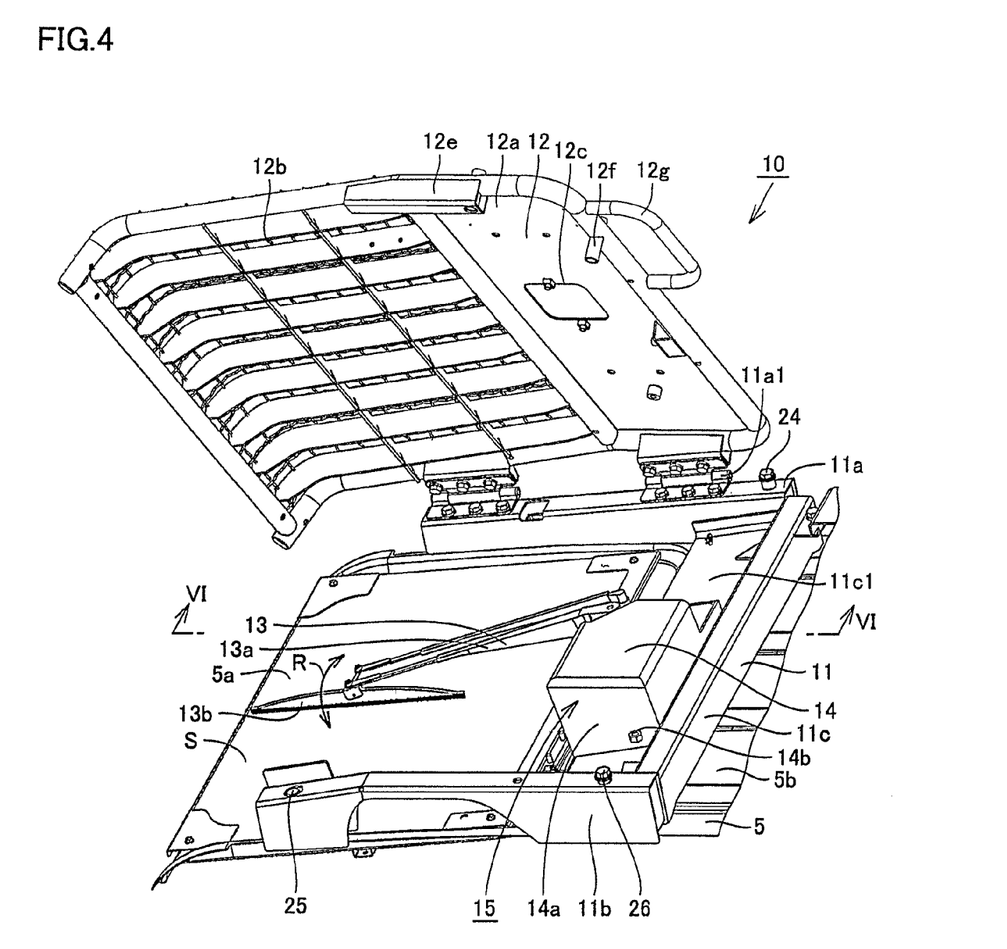
FIG. 4 is a perspective view schematically illustrating a state in which the open/close guard with a wiper according to one embodiment of the present invention is attached to the cab, and illustrating a state in which the open/close guard portion is open from the fixing frame.

Fixing frame 11 is configured to be attachable to cab 5. Fixing frame 11 has an open/close guard supporting portion 11a, an open/close guard fixing portion 11b, and a connecting portion 11c.

Open/close guard supporting portion 11a connects open/close guard portion 12 to fixing frame 11 so that open/close guard portion 12 can be opened or closed from or over fixing frame 11. Open/close guard supporting portion 11a is formed to extend in a front-back direction of a top plate 5b. Open/close guard supporting portion 11a is disposed on a right end of top plate 5b. Open/close guard supporting portion 11a has a hinge portion 11a1. Hinge portion 11a1 is connected to open/close guard portion 12 at an upper end of open/close guard supporting portion 11a. Open/close guard portion 12 is connected to open/close guard supporting portion 11a with hinge portion 11a1 so that it can be opened or closed.

Open/close guard fixing portion 11b is configured so that it can fix open/close guard portion 12 to fixing frame 11 while open/close guard portion 12 is closed over fixing frame 11. Open/close guard fixing portion 11b is formed to extend in the front-back direction of top plate 5b. Open/close guard fixing portion 11b is disposed on a left end of top plate 5b.

Connecting portion 11c has an attachment portion for open/close guard supporting portion 11a and an attachment portion for open/close guard fixing portion 11b. Connecting portion 11c extends from the attachment portion for open/close guard supporting portion 11a to the attachment portion for open/close guard fixing portion 11b. Connecting portion 11c is formed to extend in a left-right direction of top plate 5b. The attachment portion for open/close guard supporting portion 11a of connecting portion 11c is connected to a rear end of open/close guard supporting portion 11a, and the attachment portion for open/close guard fixing portion 11b of connecting portion 11c is connected to a rear end of open/close guard fixing portion 11b. Connecting portion 11c is disposed along a back end of skylight 5a. Connecting portion 11c has a mounting portion 11c1. Mounting portion 11c1 is inclined with decreasing height toward the front.

Open/close guard portion 12 is supported by fixing frame 11 so that it can be opened or closed from or over fixing frame 11. Open/close guard portion 12 has a plate-shaped portion 12a, a mesh portion 12b, an opening 12c, a cover portion 12d, a rectangular leg 12e, a cylindrical leg 12f, and a handle 12g. Mesh portion 12b is provided at the front of plate-shaped portion 12a. Mesh portion 12b is disposed above skylight 5a, and is formed to cover a surface S of skylight 5a. Opening 12c is formed in a central portion of plate-shaped portion 12a. Cover portion 12d is provided to cover opening 12c.

Rectangular leg 12e is formed to protrude below open/close guard portion 12. Rectangular leg 12e has a bottom portion that comes into contact with an upper surface of open/close guard supporting portion 11a while open/close guard portion 12 is closed over fixing frame 11. Cylindrical leg 12f is formed to protrude below open/close guard portion 12. Handle 12g is disposed at a left rear end of open/close guard portion 12. A user can open or close open/close guard portion 12 from or over fixing frame 11 by gripping handle 12g.

Wiper 13 for wiping surface S of skylight 5a has a wiper arm 13a and a wiper blade 13b. Wiper blade 13b is connected to a tip of wiper arm 13a. Wiper 13 is formed so that when wiper arm 13a rotates in an R direction indicated by the arrow in the figure, wiper blade 13b wipes the surface of skylight 5a in the R direction indicated by the arrow in the figure.

Wiper drive unit 14 rotatably supports wiper 13. Wiper drive unit 14 is attached to fixing frame 11 securely mounted on cab 5. Specifically, wiper drive unit 14 is attached to a below-described housing 14a to constitute a subassembly. This subassembly is attached to fixing frame 11 with bolt members while being mounted on mounting portion 11c1 of connecting portion 11c. Wiper drive unit 14 is covered with plate-shaped portion 12a of open/close guard portion 12. A portion of wiper drive unit 14 is disposed below opening 12c of plate-shaped portion 12a.

Wiper drive unit 14 has housing 14a and a support portion 14b on an outer surface thereof. Support portion 14b is formed to protrude outward from a left side surface of housing 14a. Support portion 14b is formed to support cylindrical leg 12f of open/close guard portion 12 while open/close guard portion 12 is closed over fixing frame 11.

Figure 5:
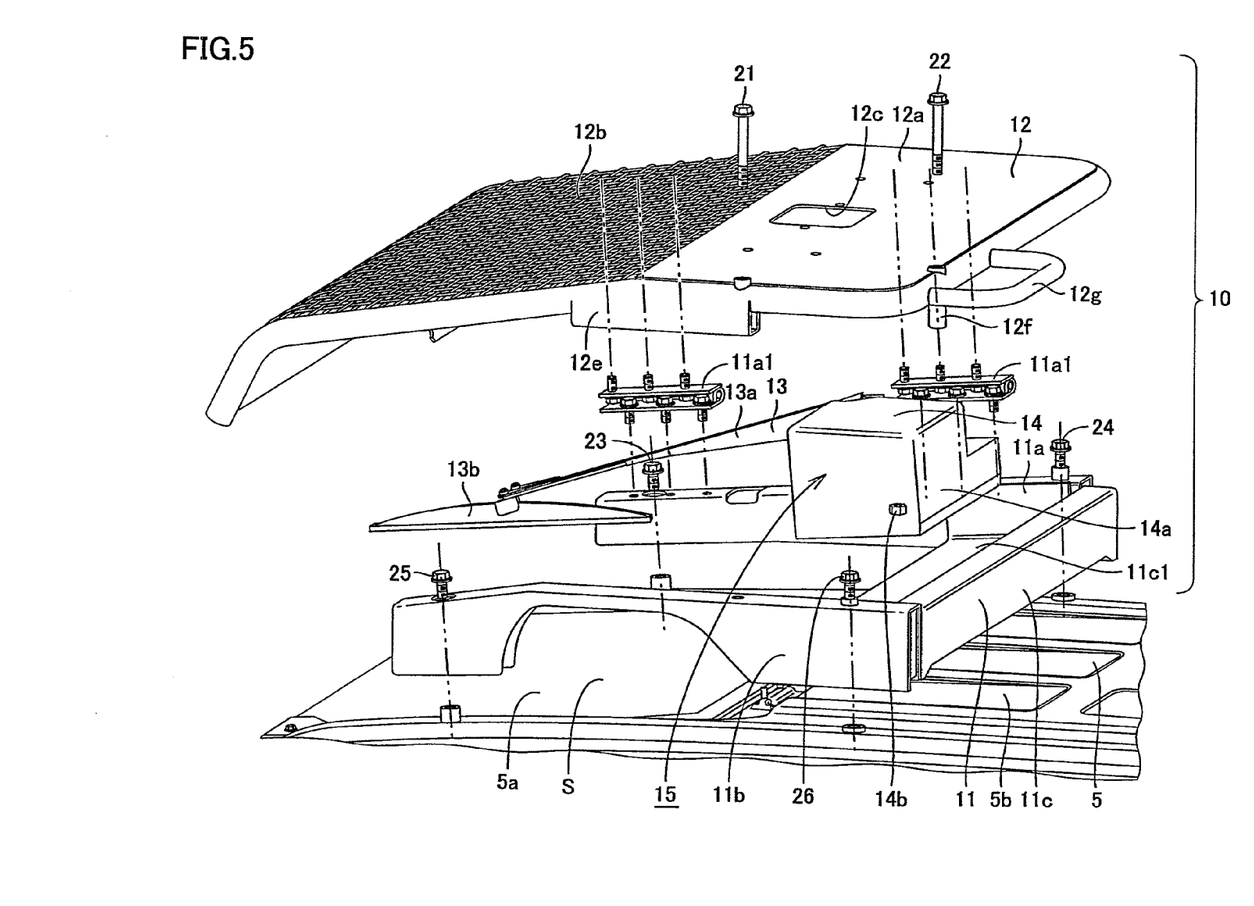
FIG. 5 is an exploded perspective view schematically illustrating the structure of the open/close guard with a wiper according to one embodiment of the present invention.

Mainly referring to FIGS. 3 and 5, open/close guard portion 12 is fixed to open/close guard fixing portion 11b with a screw member 21, and is fixed to support portion 14b with a screw member 22, while open/close guard portion 12 is closed over fixing frame 11. In this way, open/close guard portion 12 can be fixed in a closed state to fixing frame 11.

Opening 12c is disposed above wiper drive unit 14 while open/close guard portion 12 is closed over fixing frame 11. This allows the position of wiper drive unit 14 to be visually recognized through opening 12c while open/close guard portion 12 is fixed to fixing frame 11.

Open/close guard supporting portion 11a is fixed to top plate 5b with a screw member 23 and a screw member 24. Open/close guard fixing portion 11b is fixed to top plate 5b with screw member 24 and a screw member 25.

Figure 6:
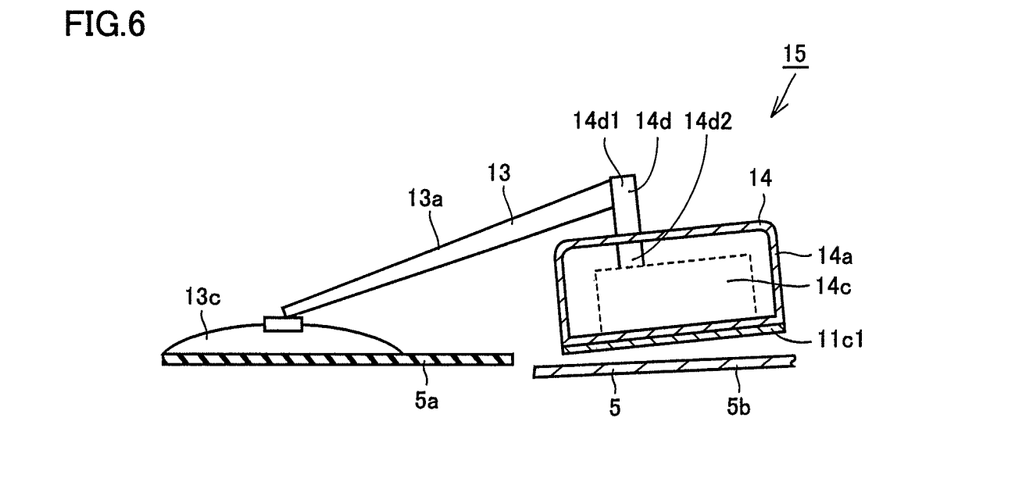
FIG. 6 is a cross-sectional view along line VI-VI in FIG. 4.

Mainly referring to FIGS. 4 and 6, wiper drive unit 14 has wiper motor 14c and output shaft 14d. Wiper motor 14c is disposed in a space inside housing 14a of wiper drive unit 14. Wiper motor 14c is connected to output shaft 14d. Wiper arm 13a is connected to output shaft 14d. Output shaft 14d includes a link mechanism to convert rotation of the output shaft of wiper motor 14c, and then swings. The driving force causes output shaft 14d to rotate, causing wiper arm 13a and wiper blade 13b to rotate.

Output shaft 14d is inclined so that an upper portion 14d1 of output shaft 14d is positioned to be closer to skylight 5a than a lower portion 14d2 of output shaft 14d. That is, output shaft 14d is inclined toward the front while open/close guard with a wiper device 10 is attached to cab 5. Wiper arm 13a connected to output shaft 14d thus extends obliquely with respect to skylight 5a. Wiper blade 13b connected to wiper arm 13a is obliquely pressed against skylight 5a.

Next, first and second modifications of the present embodiment will be described.

Figure 7:
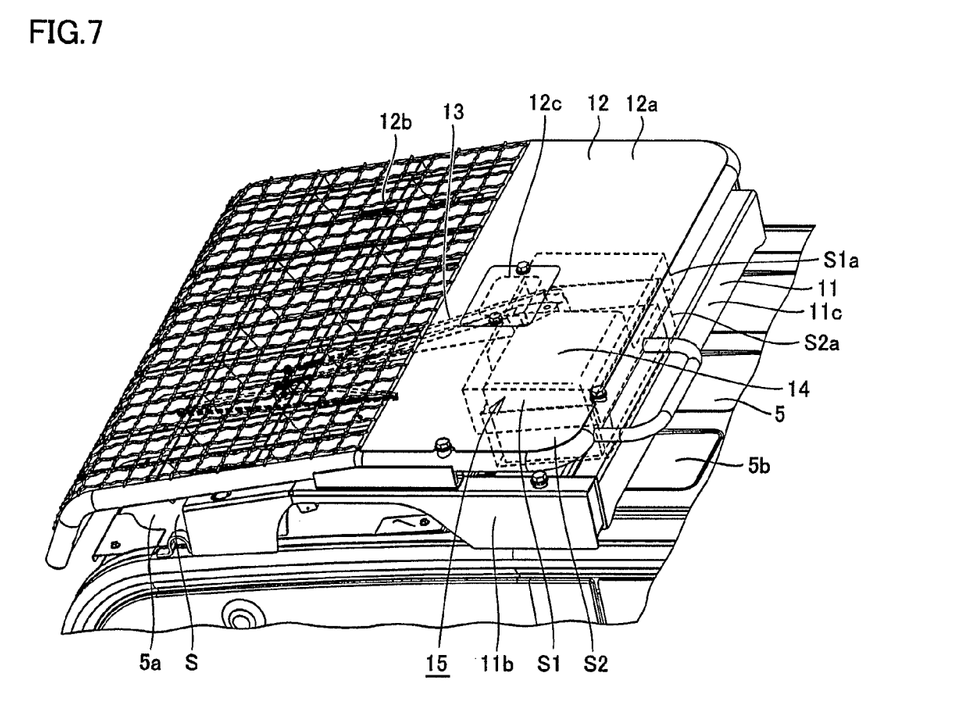
FIG. 7 is a perspective view schematically illustrating a state in which an open/close guard with a wiper according to a first modification of one embodiment of the present invention is attached to the cab, and illustrating a state in which an open/close guard portion is closed over a fixing frame.
Figure 8:
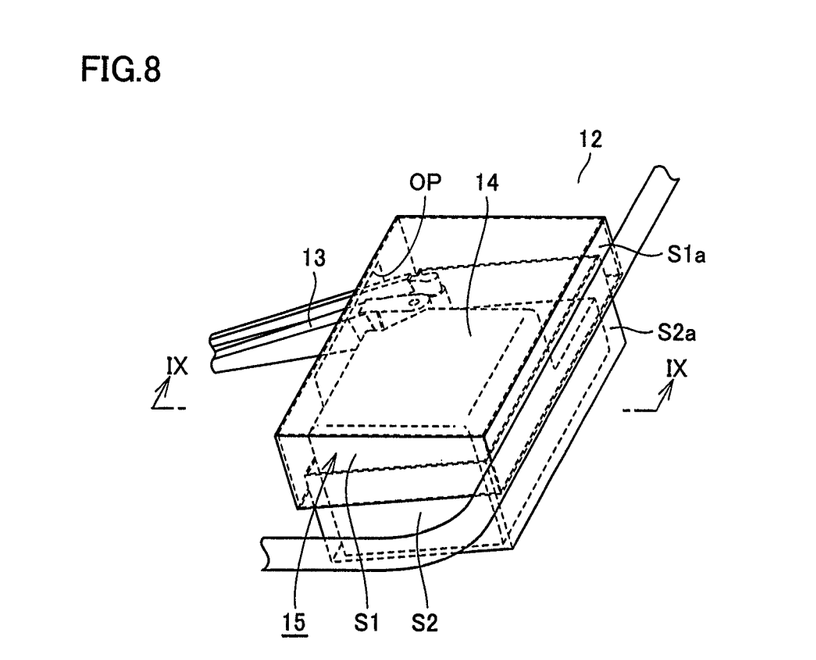
FIG. 8 is an enlarged view illustrating members peripheral to a wiper motor.
Figure 9:
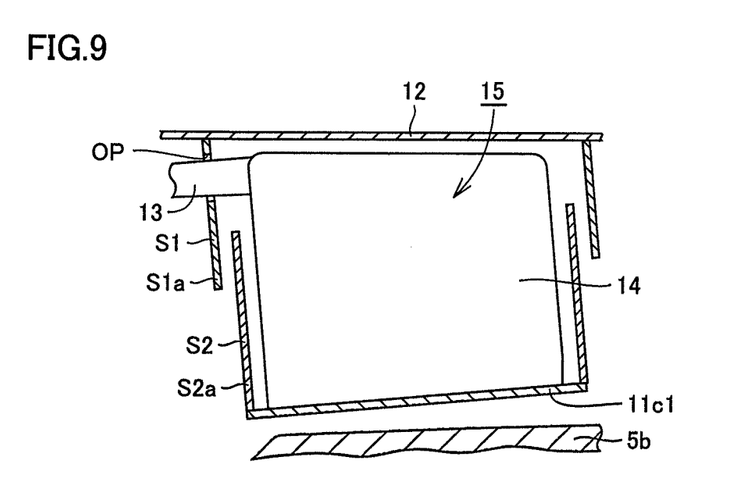
FIG. 9 is a partial cross-sectional view along line IX-IX in FIG. 8.

First, referring to FIGS. 7 to 9, the first modification of the present embodiment will be described. In the first modification of the present embodiment, open/close guard portion 12 has a first surrounding portion S1. Fixing frame 11 has a second surrounding portion S2. In FIG. 8, first surrounding portion S1 and second surrounding portion S2 are indicated by the solid lines, for the sake of clarity.

First surrounding portion S1 has a first wall portion S1a extending below from a lower surface of plate-shaped portion 12a of open/close guard portion 12. Second surrounding portion S2 has a second wall portion S2a extending above from an upper surface of mounting portion 11c1 of fixing frame 11.

First surrounding portion S1 of open/close guard portion 12 surrounds a periphery of wiper drive unit 14 while open/close guard portion 12 is closed over fixing frame 11. Second surrounding portion S2 of fixing frame 11 surrounds the periphery of wiper drive unit 14. First surrounding portion S1 is disposed outside second surrounding portion S2 while open/close guard portion 12 is closed.

First surrounding portion S1 and second surrounding portion S2 overlap with each other. That is, when seen in a direction crossing a direction in which first wall portion S1a and second wall portion S2a extend, first surrounding portion S1 and second surrounding portion S2 have their ends overlapping with each other. First surrounding portion S1 has an opening OP formed in first wall portion S1a. Wiper 13 is inserted through opening OP.

The second modification of the present embodiment will be described subsequently. Referring again to FIG. 1, and to FIG. 10, in the second modification of the present embodiment, wiper drive unit 14 is attached to open/close guard fixing portion 11b. That is, wiper drive unit 14 is disposed on the left side of the roof portion of cab 5. As illustrated in FIG. 1, work implement 4 is disposed on the right side of cab 5, so that wiper motor 14 is disposed opposite to work implement 4 in the roof portion of cab 5.

Figure 10:
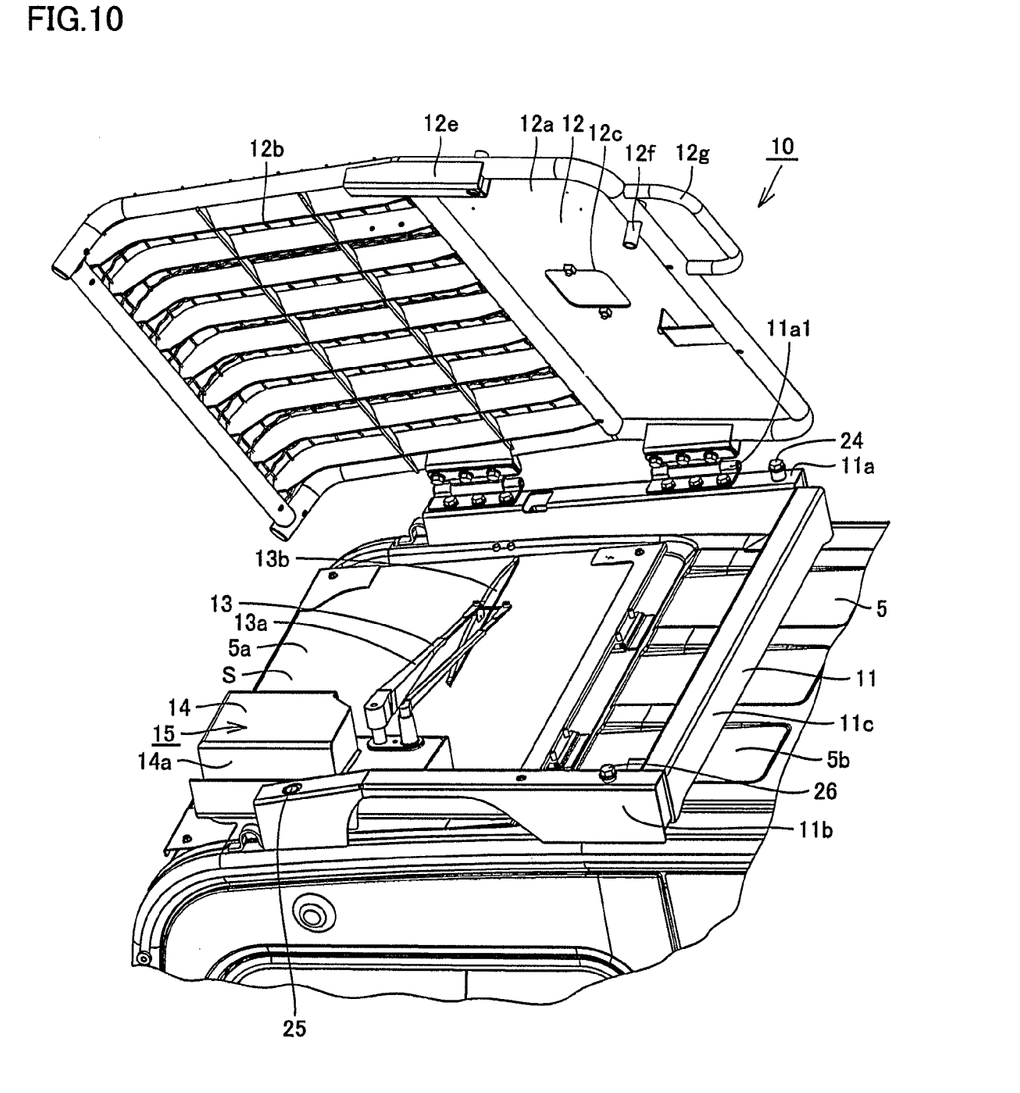
FIG. 10 is a perspective view schematically illustrating a state in which an open/close guard with a wiper according to a second modification of one embodiment of the present invention is attached to the cab.

If wiper drive unit 14 is disposed on the work implement 4-side (right side) of the roof portion of cab 5, when one sees work implement 4 from skylight 5a, work implement 4 may be difficult to see due to vision being blocked by wiper drive unit 14. In the second modification of the present embodiment, since wiper drive unit 14 is disposed opposite to work implement 4, work implement 4 does not become difficult to see due to vision being blocked by wiper drive unit 14. Visibility for work can thus be ensured.

Functions and effects of the present embodiment will be described next.

In open/close guard with a wiper device 10 according to the present embodiment, wiper drive unit 14 that rotatably supports wiper 13 is attached onto fixing frame 11. Fixing frame 11 is attached to cab 5 for supporting open/close guard portion 12. It is therefore unnecessary to add other processing or another member to cab 5 in order to provide wiper 13 on skylight 5a of cab 5. Furthermore, since wiper drive unit 14 is attached to fixing frame 11 attached to cab 5, the positions of wiper drive unit 14 and wiper 13 can be adjusted while they are not away from skylight 5a. The position of wiper 13 can thus be easily adjusted.

In open/close guard with a wiper device 10 according to the present embodiment, open/close guard supporting portion 11a and open/close guard fixing portion 11b are connected with each other with connecting portion 11c. Open/close guard supporting portion 11a, open/close guard fixing portion 11b, and connecting portion 11c can thus be integrally assembled. This allows fixing frame 11 to be easily positioned.

In open/close guard with a wiper device 10 according to the present embodiment, it is possible to prevent rainwater from attaching to wiper drive unit 14 with first surrounding portion S1 of open/close guard portion 12 and second surrounding portion S2 of fixing frame 11. Furthermore, since first surrounding portion S1 is disposed outside second surrounding portion S2 while open/close guard portion 12 is closed over fixing frame 11, it is possible to prevent rainwater attached to a surface of first surrounding portion S1 from passing through a surface of second surrounding portion S2 to be attached to wiper drive unit 14. Watertightness of open/close guard with a wiper device 10 can thus be enhanced.

In open/close guard with a wiper device 10 according to the present embodiment, output shaft 14d is inclined so that upper portion 14d1 of output shaft 14d is positioned to be closer to skylight 5a than the lower portion of output shaft 14d. Since wiper 13 is thus connected to output shaft 14d while output shaft 14d of wiper drive unit 14 is inclined with respect to skylight 5a, wiper 13 can be obliquely pressed against skylight 5a. Force of wiper 13 pressing skylight 5a can thus be increased.

In open/close guard with a wiper device 10 according to the present embodiment, open/close guard portion 12 includes opening 12c disposed above wiper drive unit 14 while open/close guard portion 12 is closed over fixing frame 11. This allows wiper motor 14 to be visually recognized through opening 12c while open/close guard portion 12 is closed over fixing frame 11. The position of wiper motor 14 can thus be accurately recognized.

With cab 5 according to the present embodiment, since open/close guard with a wiper device 10 described above is attached to cab 5, it is unnecessary to add other processing or another member to cab 5 in order to provide wiper 13 on skylight 5a. Moreover, the position of wiper 13 can be easily adjusted.

Since wiper device 15 according to the present embodiment allows the subassembly including the driving source of wiper 13 to be attached onto cab 5, it is unnecessary to add other processing or another member to cab 5 when retrofitting wiper device 15, and the subassembly is attachable onto fixing frame 11 of the open/close guard for protecting the skylight provided on cab 5, leading to easy positional adjustment relative to skylight 5a.

It is to be understood that the embodiments disclosed herein are only by way of example, and not to be taken by way of limitation. The scope of the present invention is not limited by the description above, but rather by the terms of the appended claims, and is intended to include any modifications within the scope and meaning equivalent to the terms of the claims.

INDUSTRIAL APPLICABILITY

The present invention can be particularly advantageously applied to an open/close guard with a wiper device attachable to a cab with a skylight, as well as a cab and a construction machine including the open/close guard with a wiper device.

REFERENCE SIGNS LIST

1: hydraulic excavator; 2: lower traveling unit; 2a: crawler belt; 3: upper revolving unit; 4: work implement; 4a: boom; 4b: arm; 4c: bucket; 4e: hydraulic cylinder; 5: cab; 5a: skylight; 5b: top plate; 5c: pillar; 5d: front windshield; 5e: door; 5f: front windshield wiper; 6: engine compartment; 7: counter-weight; 10: open/close guard with a wiper; 11: fixing frame; 11a: open/close guard supporting portion; 11b: open/ close guard fixing portion; 11*c*: connecting portion; 12: open/close guard portion; 12*a*: plate-shaped portion; 12*b*: mesh portion; 12*c*: opening; 13: wiper; 13*a*: wiper arm; 13*b*: wiper blade; 14: wiper motor; 14*a*: housing; 14*b*: supporting portion; 14*c*: motor main body; 14*d*: output shaft; 14*d*1: upper portion; 14*d*2: lower portion; 15: wiper device; S: surface; S1: first surrounding portion; S2: second surrounding portion.

The invention claimed is:

1. An open/close guard with a wiper device attachable to a cab with a skylight,
    said wiper device comprising:
        a wiper for wiping a surface of said skylight; and
        a wiper drive unit that rotatably supports said wiper,
    said open/close guard comprising:
        a fixing frame attachable to said cab; and
        an open/close guard portion supported by said fixing frame,
    said open/close guard portion being supported by said fixing frame so that it can be opened or closed from or over said fixing frame, and
    said wiper device being attached onto said fixing frame.

2. The open/close guard with a wiper device according to claim 1, wherein
    said fixing frame includes:
    an open/close guard supporting portion that connects said open/close guard portion to said fixing frame so that said open/close guard portion can be opened or closed from or over said fixing frame;
    an open/close guard fixing portion that can fix said open/close guard portion to said fixing frame while said open/close guard portion is closed over said fixing frame; and
    a connecting portion that has an attachment portion for said open/close guard supporting portion and an attachment portion for said open/close guard fixing portion, and extends from said attachment portion for said open/close guard supporting portion to said attachment portion for said open/close guard fixing portion.

3. The open/close guard with a wiper device according to claim 1, wherein
    said open/close guard portion includes a first surrounding portion that surrounds a periphery of said wiper drive unit while said open/close guard portion is closed over said fixing frame, and
    said fixing frame includes a second surrounding portion that surrounds a periphery of said wiper drive unit,
    said first surrounding portion being disposed outside said second surrounding portion while said open/close guard portion is closed.

4. The open/close guard with a wiper device according to claim 1, wherein
    said wiper drive unit includes an output shaft, and
    said output shaft is inclined so that an upper portion of said output shaft is positioned to be closer to said skylight than a lower portion of said output shaft.

5. The open/close guard with a wiper device according to claim 1, wherein
    said open/close guard portion includes an opening disposed above said wiper drive unit while said open/close guard portion is closed over said fixing frame.

6. A cab for a construction machine comprising an open/close guard with a wiper device according to claim 1 being attached thereto.

7. A wiper device for a skylight of a cab of a construction machine comprising:
    a wiper for wiping a surface of said skylight; and
    a wiper drive unit that rotatably supports said wiper, said wiper drive unit comprising an output shaft connected to said wiper, and a wiper motor that causes said output shaft to rotate, said output shaft and said wiper motor constituting a subassembly, and said subassembly comprising a wiper drive unit attachable onto said cab,
    said cab comprising an open/close guard for protecting said skylight,
    said open/close guard comprising:
    a fixing frame securely attached to said cab; and
    an open/close guard portion supported by said fixing frame so that it can be opened or closed from or over said fixing frame,
    said subassembly being attachable onto said fixing frame.

* * * * *